United States Patent Office 3,661,794
Patented May 9, 1972

3,661,794
SURFACTANT COMPOSITION
Alois Aignesberger, Trostberg, Upper Bavaria, Germany, assignor to Suddeutsche Kalkstickstoff-Werke AG, Trostberg, Upper Bavaria, Germany
No Drawing. Filed Feb. 9, 1970, Ser. No. 9,967
Claims priority, application Germany, Feb. 13, 1969, P 19 07 261.8
Int. Cl. B01f 17/06, 17/32, 17/34
U.S. Cl. 252—354    7 Claims

ABSTRACT OF THE DISCLOSURE

Water soluble resins obtained by condensing amino-s-triazines of the formula

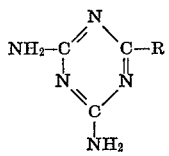

wherein R is H, $NH_2$, OH, or $C_nH_{2n+1}$, $n$ being an integer between 1 and 9, with lower alkanals or alkanones in the presence of sulfites to make the resins anionic have only negligible effects on the surface tension of water. Yet they synergistically cooperate with all ordinary anionic organic surfactants in sharply lowering the surface tension of water below that obtained by the surfactants alone. Some of the resins stabilize stock solutions of perfluorinated anionic surfactants.

---

This invention relates to surfactant compositions, and particularly to mixtures of compounds which are capable of reducing the surface tension of water.

Numerous known compounds reduce the surface tension of water, and many such compounds are stable articles of commerce and commonly referred to as wetting agents. Typical synthetic, anionic wetting agents are ammonium perfluorocaprylate, the sodium salt of tricarballylic acid trihexyl ester sulfonic acid, the sodium salt of sulfonated fatty acid condensation products, and sodium dodecylbenzenesulfonate.

Most wetting agents in present commercial use cannot reduce the surface tension of water to less than 25 to 30 dyne per cm. and this is not always sufficiently low. Perfluoro compounds permit a further reduction in the surface tension of water, but they are too costly to permit their widespread application.

The primary object of this invention is the provision of a surfactant composition capable of reducing the surface tension of water to approximately 12 dyne per cm., yet low in cost. The term "surfactant" is employed broadly to designate a wetting agent whose molecule contains at least one group having affinity to polar liquids and a radical having little affinity with water.

It has now been found that the desired properties are possessed by a composition which consists essentially of at least one anionic condensation product of an amino-s-triazine having at least two $NH_2$ groups with one or more oxo compounds, and of at least one anionic organic compound having significant surface activity of its own.

The preferred compositions of the invention contain 25 to 98 percent by weight of the condensation product and 75 to 2 percent of the anionic organic surfactant. The compositions of the invention are useful as wetting agents which reduce the surface tension of water.

The anionic condensation products of the invention are obtained by condensing an amino-s-triazine having at least two $NH_2$ groups bound to the triazine ring, such as melamine, guanamine, or ammeline, with oxo compounds, and by modifying the reaction product with sulfites or sulfonic acids. The amino-s-triazine which is employed as a starting material may be substituted at the third carbon atom without significant effects on the properties of the condensation product. Suitable substituents include alkyl, aryl, alkaryl, and hydroxyl groups. The modification by means of sulfite is resorted to when the amino-s-triazine employed lacks anionic groups, such as that of ammeline. The resin of type C (see Example 5) obtained by the condensation reaction is commercially available under the registered trademark "Melment" (Suddeutsche Kalkstickstoff-Werke AG., Trostberg, Germany, see U.S. patent application Ser. No. 615,051, now abandoned, Austrian Patent No. 263,607). The oxo compounds employed for the condensation reaction are aldehydes and ketones, preferably lower alkanols and lower alkanones, such as formaldehyde, acetaldehyde, acetone, methylethylketone, and diethylketone.

The anionic organic surfactants which are ingredients of the composition may be of any of the known types such as fatty alcohol sulfates, alkanesulfonates, alkylarylsulfonates, and the like.

The effects of the amino-s-triazine condensation resins on the surface tension of water are small or negligible when the resins are employed alone. Yet, they are capable of substantially improving the surface tension lowering effects of the cooperating anionic organic surfactants. The synergistic effect of the two components is striking. It can be varied to some extent by modifying the amino-s-triazines. Thus, sulfite modified melamine formaldehyde resins show a synergistic effect with anionic organic surfactants over a pH range of 5 to 12, and the same results are obtained when the melamine is partly replaced by guanamine.

Condensation resins derived from ammeline, such as ammeline formaldehyde resins, ammeline formaldehyde-acetaldehyde resins, and ammeline formaldehyde-acetone resins can be employed effectively only in alkaline aqueous media because they are precipitated when acids are added to their solutions. In the pH range in which they are soluble, they show the synergistic effect with any anionic organic surfactant.

The compositions of the invention are distinguished by their low cost. They are comparable in their surface tension reducing effects to ammonium perfluorocaprylate, but their cost is much lower, and they are employed successfully under conditions not suitable for the perfluoro compounds. Yet, resins of the invention (such as Resin C in Example 5 hereinbelow) cooperate with ammonium perfluorocaprylate and other perfluorinated anionic surfactants in further lowering the surface tension of aqueous media. It has also been found that old stock solutions of the perfluoro compounds which have lost their effectiveness can be reactivated by adding the resins of the invention. The three resins more specifically described in Examples 1, 4 and 5, when added in small amounts to aqueous stock solutions of perfluorinated anionic surfactants, greatly increase the shelf life of the solutions. The solutions remain clear for several months, and the synergistic effect of the resins and the surfactants is undiminished even if the pH of the stock solutions should change.

The following examples further illustrate the invention without limiting the same.

EXAMPLE 1

A Resin A of the invention was prepared in a conventional manner from melamine, capriguanamine, formaldehyde, and sodium pyrosulfite in a mole ratio of 1:0.018:3:0.5. Aqueous solutions of Resin A or of wetting agent W.A.I. (the sodium salt of tricarballylic acid trihexyl ester sulfonic acid) in various concentrations (in percent by weight), and various concentrations of Resin A together with 0.05% W.A.I. were tested for their surface tensions. The results of the tests are listed in Table I.

TABLE I

| Concentration | Surface tension, dyne per cm. | | |
|---|---|---|---|
| | W.A.I. | Resin A | R.A. plus 0.05% W.A.I. |
| Percent: | | | |
| 0.00 | 72.6 | 72.6 | |
| 0.05 | 31.1 | 72.4 | 24.8 |
| 0.10 | 26.7 | 72.0 | 21.1 |
| 0.20 | | 71.2 | 19.9 |
| 0.25 | 25.4 | | |
| 0.50 | 25.3 | 70.4 | 19.7 |
| 1.0 | 25.2 | 70.0 | 19.6 |
| 2.0 | 25.7 | | |

The synergistic effect is evident from the table. Whereas W.A.I. in a concentration of 0.20 g. per 100 g. of its aqueous solution can reduce the surface tension only to approximately 26 dyne/cm., and Resin A alone at the same concentration is without significant effect on the surface tension, a solution containing 0.20 g. of R.A. and only 0.05 g. W.A.I. per 100 g. has a surface tension of less than 20 dyne/cm.

EXAMPLE 2

Resin A cooperates with other anionic organic surfactants in the same manner as with W.A.I., as is shown in Table II which is analogous to Table I. The results listed in Table II were arrived at as in Example 1, using wetting agent W.A.II (a sulfonated fatty acid condensation product of the formula $C_{18}H_{35}CO_2CH_2CH_2SO_3Na$).

TABLE II

| Concentration | Surface tension, dyne per cm. | | |
|---|---|---|---|
| | W.A.II | Resin A | R.A. plus 0.05% W.A.II |
| Percent: | | | |
| 0.00 | 72.6 | 72.6 | |
| 0.05 | 32.9 | 72.4 | 30.6 |
| 0.10 | 32.7 | 72.0 | 29.2 |
| 0.20 | | 71.2 | 28.2 |
| 0.25 | 31.7 | | |
| 0.4 | | | 28.1 |
| 0.5 | 31.5 | 70.4 | |
| 1.0 | 31.6 | 70.0 | 27.2 |
| 2.0 | 31.9 | | 24.6 |

EXAMPLE 3

Tests analogous to those of Examples 1 and 2 were performed with wetting agent W.A.III (sodium dodecylbenzenesulfonate) and Resin A, and the results are listed in Table III as above.

TABLE III

| Concentration | Surface tension, dyne per cm. | | |
|---|---|---|---|
| | W.A.III | Resin A | R.A. plus 0.05% W.A.III |
| Percent: | | | |
| 0.00 | 72.6 | 72.6 | |
| 0.05 | 38.8 | 72.4 | 35.0 |
| 0.10 | 36.8 | 72.0 | 33.1 |
| 0.2 | | 11.2 | 31.3 |
| 0.25 | 36.9 | | |
| 0.4 | | | 29.4 |
| 0.5 | 36.5 | 70.4 | |
| 1.0 | 34.9 | 70.0 | 27.5 |
| 2.0 | 34.7 | | 25.6 |

EXAMPLE 4

Resin B was prepared by condensation of ammeline with formaldehyde in a mole ratio of 1:2, and surface tension tests were made with Resin B and wetting agent W.A.I in the manner of Example 1. The results are listed in Table IV.

TABLE IV

| Concentration | Surface tension, dyne per cm. | | |
|---|---|---|---|
| | W.A.I | Resin B | R.B. plus 0.05% W.A.I |
| Percent: | | | |
| 0.00 | 72.6 | 72.6 | |
| 0.02 | | 71.9 | 27.2 |
| 0.1 | 26.7 | 71.6 | 21.6 |
| 0.2 | | 71.2 | 20.7 |
| 0.25 | 25.4 | | |
| 0.4 | | 70.9 | 19.7 |
| 0.5 | 25.3 | | |
| 0.9 | | 70.0 | |
| 1.0 | 25.2 | | 19.6 |
| 1.8 | | 69.7 | |
| 2.0 | 25.7 | | |

EXAMPLE 5

A resin C of the invention was prepared by condensing melamine, formaldehyde, and sodium pyrosulfite in a mole ratio of 1:3:0.5. The surface tension effects produced by the resin alone, by a commercial mixture of perfluorinated, anionic surfactants, W.A.IV, and by various mixtures of Resin C and W.A.IV were measured. The results are shown in Table V which lists the effects of the resin and the wetting agent alone at various concentrations, and the effects of combinations in which the resin concentration was varied, while the wetting agent was kept at a constant concentration of 0.05%.

TABLE V

| Concentration | Surface tension, dyne per cm. | | |
|---|---|---|---|
| | W.A.IV | Resin C | 0.05% W.A.IV plus R.C. |
| Percent: | | | |
| 0.05 | 15.0 | 72.6 | 12.1 |
| 0.10 | 15.0 | 72.3 | 12.0 |
| 0.20 | 15.0 | 71.0 | 11.9 |
| 0.50 | 15.0 | 70.1 | 11.6 |
| 1.0 | 15.0 | 69.8 | 11.5 |
| 5.0 | 15.0 | 69.0 | 11.5 |

A small addition of Resin C additionally stabilized the solutions of the wetting agent W.A.IV, so that it was unnecessary to add alkali or an organic solvent.

The dry compositions of the invention are prepared by mixing one or more of the condensation resins with one or more of the conventional organic surfactants in a ratio which may be chosen widely as is evident from the several examples. For most compositions, it is advantageous from the point of view of low cost to mix as much of the resin with the anionic organic surfactant as is compatible with the desired result, and the most advantageous amount of resin is normally between 25 and 98% of the total composition weight, as illustrated particularly in Example 5.

What is claimed is:
1. A composition capable of reducing the surface tension of water, said composition essentially consisting of a mixture of
   (a) at least one water-soluble, anionic condensation product of one mole of an amino-s-triazine of the formula

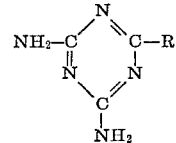

with substantially as many moles of a lower alkanol or lower alkanone as there are amine groups in said amino-s-triazine; and
   (b) at least one synthetic, organic, anionic surfactant capable of lowering said surface tension in the absence of said condensation product and selected from the group consisting of fatty alcohol sulfates, alkylarylsulfonates, alkanesulfonates, ammonium perfluorocaprylate, the sodium salt of tricarballylic acid trihexyl ester sulfonic acid, and the sodium salt of sulfonated fatty acid condensation products, (1) in said formula, R being hydrogen, $NH_2$, hydroxyl, or $C_nH_{2n+1}$, and $n$ being an integer not greater than 9, (2) the amount of said anionic condensation product being 25 to 98 percent of the weight of said mixture and sufficient to make the surface tension lowering effect of said mixture greater than the sum of the surface-tension lowering effects of said anionic condensation product and of said surfactant.

2. A composition as set forth in claim 1, which is an aqueous solution of said mixture.

3. A composition as set forth in claim 1, wherein said surfactant is sodium dodecylbenzene sulfonate.

4. A composition as set forth in claim 1, wherein said surfactant is a sodium salt of a sulfonated fatty acid condensation product having the formula $$C_{18}H_{35}CO_2CH_2CH_2SO_3Na$$

5. A composition as set forth in claim 1, wherein said anionic condensation product is the product of condensation of melamine and formaldehyde in a mole ratio of substantially 1:3.0, the condensation being performed in the presence of substantially 0.5 mole sodium pyrosulfite.

6. A composition as set forth in claim 5, wherein said surfactant is ammonium perfluorocaprylate, the ratio of said anionic condensation product to said surfactant being between 1:1 and 100:1 by weight.

7. A method of reducing the surface tension of water which comprises dissolving in said water an effective amount of the composition set forth in claim 1.

References Cited
UNITED STATES PATENTS

| | | | |
|---|---|---|---|
| 2,368,277 | 1/1945 | Von Becker | 252—355 X |
| 2,652,341 | 9/1953 | Craig | 252—355 X |
| 3,163,647 | 12/1964 | Schaefer et al. | 252—357 X |
| 3,297,690 | 1/1967 | Harrison | 252—357 X |

RICHARD D. LOVERING, Primary Examiner

U.S. Cl. X.R.

252—355, 356, 357